United States Patent
Engelen et al.

(10) Patent No.: US 10,134,071 B2
(45) Date of Patent: Nov. 20, 2018

(54) METHODS AND APPARATUS FOR CONFIGURING A LIGHTING FIXTURE IN A VIRTUAL ENVIRONMENT

(71) Applicant: PHILIPS LIGHTING HOLDING B.V., Eindhoven (NL)

(72) Inventors: Dirk Valentinus Rene Engelen, Heusden-Zolder (BE); Bram Knaapen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 476 days.

(21) Appl. No.: 14/406,762

(22) PCT Filed: Jun. 10, 2013

(86) PCT No.: PCT/IB2013/054735
§ 371 (c)(1),
(2) Date: Dec. 10, 2014

(87) PCT Pub. No.: WO2013/186684
PCT Pub. Date: Dec. 19, 2013

(65) Prior Publication Data
US 2015/0154808 A1 Jun. 4, 2015

Related U.S. Application Data

(60) Provisional application No. 61/658,048, filed on Jun. 11, 2012.

(51) Int. Cl.
*G06Q 30/06* (2012.01)
*G06T 15/50* (2011.01)
(Continued)

(52) U.S. Cl.
CPC ..... *G06Q 30/0621* (2013.01); *G06F 3/04842* (2013.01); *G06F 3/04847* (2013.01);
(Continued)

(58) Field of Classification Search
CPC .............. G06Q 30/0621; H05B 37/029; H05B 37/0245
See application file for complete search history.

(56) References Cited

U.S. PATENT DOCUMENTS 5,307,295 A * 4/1994 Taylor ................ G06F 17/5009
315/292
5,422,717 A * 6/1995 Hattori ..................... G01J 1/00
356/221

(Continued)

FOREIGN PATENT DOCUMENTS

| CN | 101622910 A | 1/2010 |
| WO | 2009087537 A2 | 7/2009 |
| WO | 2011023404 A1 | 3/2011 |

*Primary Examiner* — William Bashore
*Assistant Examiner* — Nathan Shrewsbury
(74) *Attorney, Agent, or Firm* — Meenakshy Chakravorty (57) ABSTRACT

Methods and apparatus for configuring a lighting fixture in a virtual environment. The methods and apparatus may enable a user to directly or indirectly manipulate a virtual lighting effect in a virtual environment and be presented with virtual representations of one or more lighting fixtures that correspond to producible lighting fixtures that are capable of producing the manipulated lighting effect.

15 Claims, 5 Drawing Sheets

(51) Int. Cl.
*G06F 3/0484* (2013.01)
*G06T 19/20* (2011.01)

(52) U.S. Cl.
CPC .............. *G06T 15/50* (2013.01); *G06T 19/20* (2013.01); *G06T 2200/24* (2013.01)

(56) References Cited

U.S. PATENT DOCUMENTS

| | | | |
|---|---|---|---|
| 6,050,702 | A | 4/2000 | Chuang et al. |
| 6,484,169 | B1 | 11/2002 | Wilsford |
| 7,550,935 | B2 | 6/2009 | Lys et al. |
| 7,734,512 | B2 | 6/2010 | Tuttle et al. |
| 8,405,657 | B2 * | 3/2013 | Breton ................... G06T 15/50 345/419 |
| 8,797,321 | B1 * | 8/2014 | Bertolami ............... G06T 15/50 345/426 |
| 8,872,853 | B2 * | 10/2014 | Sugden ................ G02B 27/017 345/426 |
| 9,393,641 | B2 * | 7/2016 | Byars ..................... H01L 24/75 |
| 9,495,796 | B2 * | 11/2016 | Breton ................... G06T 15/50 |
| 2002/0177982 | A1 | 11/2002 | Boulouednine et al. |
| 2003/0179218 | A1 * | 9/2003 | Martins ................... G06T 19/00 345/633 |
| 2005/0081161 | A1 * | 4/2005 | MacInnes ........... G06F 17/5004 715/765 |
| 2005/0248299 | A1 * | 11/2005 | Chemel ............... H05B 37/029 315/312 |
| 2006/0158899 | A1 * | 7/2006 | Ayabe ................. F21V 7/0091 362/602 |
| 2007/0189026 | A1 * | 8/2007 | Chemel ............... H05B 37/029 362/458 |
| 2008/0033843 | A1 | 2/2008 | Warton et al. |
| 2008/0262805 | A1 | 10/2008 | Lin et al. |
| 2009/0009984 | A1 * | 1/2009 | Mangiardi ........... H05B 37/029 362/85 |
| 2009/0109240 | A1 * | 4/2009 | Englert ................ G06T 19/006 345/633 |
| 2011/0035404 | A1 * | 2/2011 | Morgan ............... H05B 37/029 707/769 |
| 2011/0245939 | A1 | 10/2011 | Crookham et al. |
| 2012/0033438 | A1 | 2/2012 | McCallum |
| 2012/0050254 | A1 | 3/2012 | Gordin et al. |
| 2012/0095745 | A1 | 4/2012 | Le Guevel-Scholtens et al. |
| 2012/0173382 | A1 * | 7/2012 | Loveland ........... G06Q 30/0601 705/26.5 |
| 2012/0206911 | A1 * | 8/2012 | Pickard ................... F21S 8/026 362/231 |
| 2013/0182225 | A1 * | 7/2013 | Stout ..................... G03B 15/10 352/48 |
| 2013/0194259 | A1 * | 8/2013 | Bennett ................ G06T 19/006 345/420 |
| 2014/0062297 | A1 * | 3/2014 | Bora ................. H05B 33/0863 315/34 |
| 2014/0125668 | A1 * | 5/2014 | Steed ..................... G06T 15/50 345/426 |
| 2015/0278896 | A1 * | 10/2015 | Seuntiens ........... H05B 37/029 705/26.41 |
| 2015/0286724 | A1 * | 10/2015 | Knaapen ............. H05B 37/029 703/1 |

* cited by examiner

METHODS AND APPARATUS FOR CONFIGURING A LIGHTING FIXTURE IN A VIRTUAL ENVIRONMENT

CROSS-REFERENCE TO PRIOR APPLICATIONS

This application is the U.S. National Phase application under 35 U.S.C. §371 of International Application No. PCT/IB2013/054735, filed on Jun. 10, 2013, which claims the benefit of U.S. Provisional Patent Application No. 61/658,048, filed on Jun. 11, 2012. These applications are hereby incorporated by reference herein.

TECHNICAL FIELD

The present invention is directed generally to configuration of a lighting fixture in a virtual environment. More particularly, various inventive methods and apparatus disclosed herein relate to configuration of a lighting fixture through manipulation of a virtual lighting effect in a virtual environment.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

Virtual lighting fixture catalogs are often utilized as a means for browsing through an offering of lighting fixtures, such as LED-based lighting fixtures. Such catalogs are often organized based on lighting fixture families. A user may select a lighting fixture family and browse categories of lighting fixtures within that family. For every category of lighting fixture, one or more pictures or descriptions of lighting fixtures within that category are presented. The user may select the pictures or descriptions of the lighting fixtures to obtain additional information regarding the lighting fixture.

Although existing lighting fixture catalogs enable a user to locate existing lighting fixture designs, they may suffer from one or more drawbacks. For example, lighting fixture catalogs may not enable a user to identify one or more suitable lighting fixtures through virtual manipulation of a lighting effect. Also, for example, lighting fixture catalogs may be limited to a fixed set of lighting fixtures and not enable selection of a unique lighting fixture by a user. Existing lighting fixture catalogs may suffer from one or more additional and/or alternative drawbacks.

Thus, there is a need in the art to provide methods and apparatus related to a configuration of a lighting fixture that optionally overcomes one or more drawbacks of existing approaches.

SUMMARY

The present disclosure is directed to inventive methods and apparatus for configuring a lighting fixture in a virtual environment. The methods and apparatus may enable a user to directly or indirectly manipulate a virtual lighting effect in a virtual environment and be presented with virtual representations of one or more lighting fixtures that correspond to producible lighting fixtures that are capable of producing the manipulated lighting effect.

Generally, in one aspect, a computer-implemented method of enabling configuration of a lighting fixture through manipulation of a lighting effect in a virtual environment is provided and includes: providing a virtual environment including a virtual lighting fixture and a virtual lighting effect; the virtual lighting fixture being indicative of a producible lighting fixture; the virtual lighting effect generated by the virtual lighting fixture and indicative of a producible light output generated by the producible lighting fixture; enabling a user to manipulate one or more parameters in the virtual environment to create a second virtual lighting effect; and providing a second virtual lighting fixture in response to manipulation of the parameters; the second virtual lighting fixture indicative of a second producible lighting fixture; the second virtual lighting effect being indicative of a producible second light output achievable by the producible second lighting fixture and non-achievable by the producible lighting fixture.

In some embodiments, the virtual environment includes an environmental object. In some versions of those embodiments the virtual lighting effect is incident on the environmental object. In some versions of those embodiments the method further includes enabling a user to manipulate the positioning of the virtual lighting fixture relative to the environmental object in the virtual environment to manipulate the parameters of the virtual lighting effect on the environmental object.

In some embodiments, the step of enabling a user to manipulate the parameters includes enabling direct manipulation of the dimensions of the virtual lighting effect through selection and dragging of a marking associated with the virtual lighting effect.

In some embodiments, the step of enabling a user to manipulate the parameters includes user entry of the parameters of the virtual lighting effect.

In some embodiments, the parameters include at least one of footprint size, footprint shape, intensity, and color of the virtual lighting effect.

In some embodiments, the method further includes submitting an order for the second producible lighting fixture after selection of the second producible lighting fixture by the user.

Generally, in another aspect, a computer-implemented method of enabling configuration of a lighting fixture through manipulation of a lighting effect in a virtual environment is provided and includes: providing a virtual environment including a virtual lighting fixture and a virtual lighting effect; the virtual lighting fixture being indicative of a producible lighting fixture; the virtual lighting effect generated by the virtual lighting fixture and indicative of a producible light output achievable by the producible lighting fixture; receiving a virtual lighting effect manipulation input from a user altering at least one parameter of the virtual lighting effect; determining a second lighting effect based on the virtual lighting effect manipulation input; identifying a second virtual lighting fixture indicative of a second producible lighting fixture capable of producing the second lighting effect; and providing the second virtual lighting fixture to the user.

In some embodiments, the method further includes providing the second virtual lighting fixture in the virtual environment. In some versions of those embodiments the method further includes providing a second virtual lighting effect in the virtual environment indicative of the second lighting effect, wherein the second virtual lighting effect is generated by the second virtual lighting fixture in the virtual environment.

In some embodiments, the second lighting effect is non-achievable by the producible lighting fixture.

In some embodiments, the virtual lighting effect manipulation input is generated by user manipulation of the position of the virtual lighting fixture in the virtual environment.

In some embodiments, the virtual lighting effect manipulation input is generated by direct user manipulation of the dimensions of the virtual lighting effect.

In some embodiments, the virtual lighting effect manipulation input is generated by user entry of the parameter of the virtual lighting effect.

In some embodiments, the method further includes providing an environmental object in the virtual environment. In some versions of those embodiments the virtual lighting effect is incident on the environmental object. In some embodiments the method further includes submitting an order for the second producible lighting fixture after selection of the second producible lighting fixture by the user.

Generally, in another aspect, a computer implemented method of enabling selection of a lighting fixture in a virtual catalog is provided and includes: receiving a lighting fixture family selection; providing a virtual lighting effect corresponding to the lighting fixture family selection; receiving a virtual lighting effect manipulation input from a user altering at least one parameter of the virtual lighting effect to create an altered virtual lighting effect; providing virtual representations of a plurality of lighting fixture selections each indicative of a producible lighting fixture capable of producing the altered virtual lighting effect.

In some embodiments, the virtual lighting effect manipulation input is generated by user manipulation of the dimensions of the virtual lighting effect through selection and dragging of the virtual lighting effect.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Virtual lighting fixture catalogs are often utilized as a means for browsing through an offering of lighting fixtures, such as LED-based lighting fixtures. Although existing lighting fixture catalogs enable a user to locate existing lighting fixture designs, they may suffer from one or more drawbacks. For example, lighting fixture catalogs may not enable a user to identify one or more suitable lighting fixtures through virtual manipulation of a lighting effect and/or may be limited to a fixed set of lighting fixtures. Thus, Applicants have recognized and appreciated a need in the art to provide methods and apparatus related to a configuration of a lighting fixture that optionally overcomes one or more drawbacks of existing approaches.

More generally, Applicants have recognized and appreciated that it would be beneficial to provide configuration of a lighting fixture through manipulation of a virtual lighting effect in a virtual environment. In view of the foregoing, various embodiments and implementations of the present invention are directed to configuration of a lighting fixture in a virtual environment.

Lighting fixtures, such as those employing LEDs, may enable multiple lighting functions within a single lighting fixture. For example, a single lighting fixture may provide up-lighting and/or downlighting. Also, for example, a single lighting fixture may enable control over the intensity level, beam size, beam shape, and/or color of generated light. Moreover, flexible lighting fixture manufacturing methods may provide multiple options for customizing lighting fixtures. Flexible lighting fixture manufacturing methods may enable a user to create and adapt a unique lighting fixture in a design process, and have the unique lighting fixture produced. For example, the shape of the lighting fixture may be customizable by a user, the optics and/or LEDs of the lighting fixture may be customizable by a user, a degree of translucency present in one or more of the lighting fixture components may be customizable by a user, and/or control effects may be customizable by a user. One of ordinary skill in the art, having had the benefit of the present disclosure, will recognize and appreciate that additional and/or alternative features of a lighting fixture may be customizable by a user in selecting and/or creating a lighting fixture according to one or more methods and/or apparatus described herein. Moreover, one of ordinary skill in the art, having had the benefit of the present disclosure, will recognize and appreciate that one or more methods and/or apparatus described herein may be utilized to select a lighting fixture from one or more non-customizable lighting fixtures.

Figure 1:
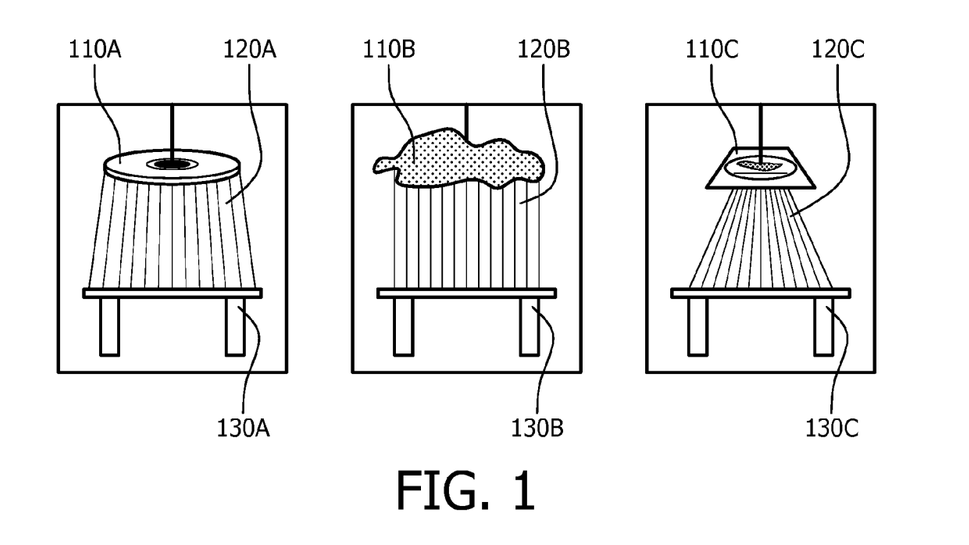
FIG. 1 illustrates virtual representations of three examples of lighting fixture families.

Referring to FIG. 1, virtual representations of three lighting fixture families are illustrated. Representative lighting fixtures 110A-C of the lighting fixture families are illustrated generating respective lighting effects 120A-C directed toward respective dining tables 130A-C located below the lighting fixtures 110A-C. The illustrated lighting fixtures 110A-C are hanging lighting fixtures that may be used, for example, over a table such as dining tables 130A-C. Each of the lighting fixture families is representative of a collection of lighting fixtures that have commonalities and have been defined as belonging to the same general family of lighting fixtures. For example, a lighting fixture family may include lighting fixtures that have common visual characteristics to an observer.

In some embodiments, the virtual representations of the lighting fixture families may be presented to a user and the user may select one of the lighting fixture families to enable the user to choose from one or more lighting fixtures of the lighting fixture family. The lighting fixture families may be presented to a user individually (e.g., one by one) and/or in combination with other lighting fixture families (e.g., two or more of the illustrated lighting fixture families, optionally with other lighting fixture families). The user may browse through the individual lighting fixture families, may search for one or more lighting fixture families based on one or more search criteria (e.g., name, style, price, popularity, utilization location, and/or functionality), and/or may otherwise be presented with one or more virtual representations of lighting fixture families from which to choose.

Figure 2:
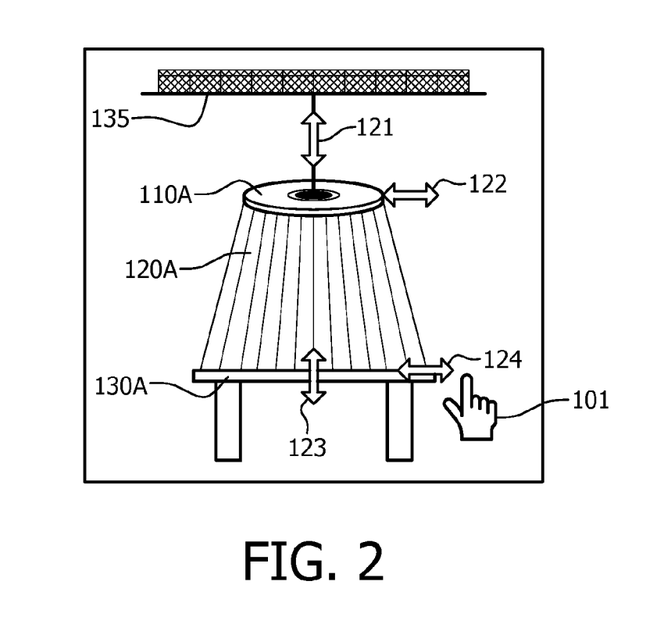
FIG. 2 illustrates an example of a virtual environment that includes one of the lighting fixtures of the lighting fixture families of FIG. 1 and illustrates parameters of the virtual environment or the virtual representation of the lighting fixture that may be adjusted by a user to manipulate a virtual lighting effect of the lighting fixture.

FIG. 2 illustrates an example of a virtual environment that includes the representative lighting fixture 110A of one of the lighting fixture families of FIG. 1. In some implementations the virtual environment of FIG. 2 may be displayed after a user selects the lighting fixture family having lighting fixture 110A. The representative lighting fixture 110A is illustrated suspended from a ceiling 135 above the dining table 130A. The lighting effect 120A is illustrated as being generated by the lighting fixture 110A and is directed toward the dining table 130A.

In some embodiments, a user may optionally choose to have additional and/or alternative environmental objects displayed besides dining table 130A. For example, the user may have two dining tables they would like illuminated and choose to have two dining tables displayed in the virtual environment. Also, for example the user may have a wider table they would like illuminated and choose to have a wider table displayed in the virtual environment. Also, for example, the user may wish to only illuminate the floor and the dining table 130A may be omitted and a floor optionally displayed in the virtual environment. Also, for example, in some embodiments the user may upload and/or create a model of an object and/or environment for display as all or part of the virtual environment. For example, the model can be created via 3D drawing software and/or 3D scanning software that enables modeling of an object and/or an environment.

Lighting parameter adjustment arrows 121-124 represent adjustable aspects of the virtual environment or the virtual representation of the lighting fixture that may be manipulated by a user to directly or indirectly adjust one or more parameters of the virtual lighting effect 120A generated by the lighting fixture 110A. The lighting parameter adjustment arrows 121-124 may be manipulated by a user utilizing a user interface. In some embodiments the lighting parameter adjustment arrows 121-124 may be manipulated by a user by selecting one of the arrows 121-124 via a user interface device that controls pointer 101 and dragging the selected arrow in a desired direction utilizing pointer 101. In some embodiments the lighting parameter adjustment arrows 121-124 may be manipulated by a user via one or more known touchscreen methods. For example, one of the adjustment arrows 121-124 may be selected and dragged with a finger. Also, for example, one of the adjustment arrows 121-124 may be selected with a finger and then the orientation of the device having the touchscreen adjusted by a user to manipulate the selected arrow. One of ordinary skill in the art, having had the benefit of the present disclosure, will recognize and appreciate that additional and/or alternative user interfaces and/or other methods may be utilized to adjust one or more aspects of the virtual environment to adjust one or more parameters of the virtual lighting effect.

Arrow 121 may be actuated to adjust the vertical position of the lighting fixture 110A relative to the ceiling 135 and, as a result, adjust the footprint of the virtual lighting effect 120A that is present on the table 130A and/or beyond the table 130A. For example, moving the lighting fixture 110A closer to the ceiling 135 will increase the beam size of the virtual lighting effect on the table 130A. Arrow 122 may be actuated to adjust the size of the light emitting area of the virtual lighting effect 120A at the lighting fixture 110A (e.g., the width of the upper portion of the virtual lighting effect 120A). For example, actuating the arrow 122 outward from the lighting fixture 110A will increase the area of the virtual lighting effect 120A emitting from the lighting fixture 110A. For instance, adjusting the arrow 122 outward may increase the diameter of the lighting fixture 110A and/or may add light emitting elements such as LEDs proximal the outer diameter of the lighting fixture 110A to increase the area of the virtual lighting effect 120A emitting from the lighting fixture 110A. Arrow 123 may be actuated to adjust the position of the table 130A relative to the lighting fixture 110 and, as a result, adjust the footprint of the virtual lighting effect 120A present on the table 130A and/or beyond the table 130A. For example, moving the table 130A closer to the lighting fixture 110A will decrease the beam size of the virtual lighting effect on the table 130A. Arrow 124 may be actuated to directly adjust the footprint of the virtual lighting effect 120A present on the table 130A. For example, moving arrow 124 outward will increase the beam size of the virtual lighting effect on the table 130A and possibly beyond the table 130A.

One of ordinary skill in the art, having had the benefit of the present disclosure, will recognize and appreciate that additional and/or alternative adjustments may optionally be made either directly or indirectly to the virtual lighting effect 120A via a user interface. For example, in some embodiments one or more of footprint shape, lighting effect intensity, and/or lighting effect color may additionally and/or alternatively be adjusted by a user. For instance, in a touchscreen implementation a two finger pinch gesture may be utilized to adjust the intensity of the virtual lighting effect 120A and/or a double tap of the virtual lighting effect 120A may be used to bring up entry options for manipulating one or more additional lighting effect parameters of the virtual lighting effect 120A.

Figure 3:
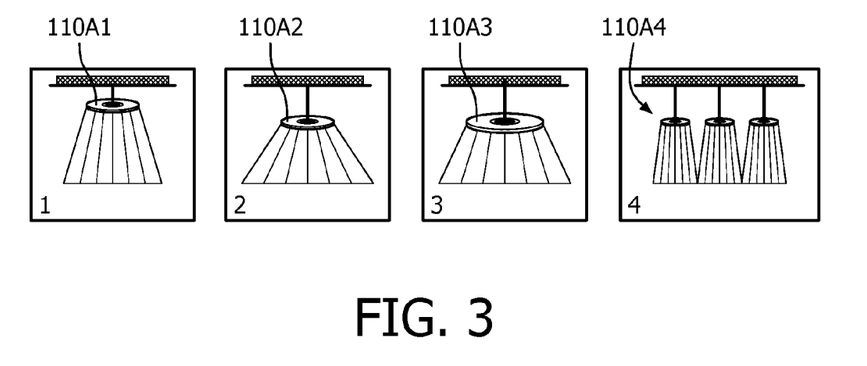
FIG. 3 illustrates example virtual representations of four separate lighting fixtures that may be selected to achieve a manipulated lighting effect.

Referring to FIG. 3, four example virtual representations of four separate lighting fixtures 110A1-A4 that may be selected to achieve a manipulated lighting effect of the virtual lighting effect 120A are illustrated. In some embodiments the four separate lighting fixtures 110A1-A4 may be displayed in response to a user adjustment of the arrow 124 of FIG. 2 outward to increase the footprint of the virtual lighting effect 120A and may represent options for providing a larger footprint.

In some embodiments, the additional options may be displayed automatically in response to any direct or indirect adjustment of the lighting effect 120A that necessitates adjustment of the configuration of the lighting fixture 110A and/or that enables use of alternative lighting fixtures to achieve the adjustment to the lighting effect 120A. In some embodiments the additional options may be displayed in response to a user indicating a completed lighting effect manipulation. In some implementations a user may indicate a completed lighting effect manipulation by entering a carriage return and/or other character. In some implementations a user may indicate a completed lighting effect manipulation by selecting a completion button in a user interface presented to the user (e.g., in combination with the virtual environment). In some implementations a user may indicate a completed lighting effect manipulation by speaking a command in a speech user interface. In some implementations a user may indicate a completed lighting effect manipulation by pausing more than a predetermined amount of time during adjustment of the lighting effect 120A. One of ordinary skill in the art, having had the benefit of the present disclosure, will recognize and appreciate that other forms of indicating a completed lighting effect manipulation may optionally be utilized.

Lighting fixture 110A1 is similar to lighting fixture 110A but is mounted at a higher location relative to the table 130A than the location of FIG. 2 to provide a larger footprint at the table 130A and includes additional LEDs to maintain a similar light intensity at the lighting effect footprint. Lighting fixture 110A2 is similar to lighting fixture 110A but includes alternative optics paired with LEDs thereof to provide a wider dispersion of light output generated by the LEDs and includes additional LEDs to maintain a similar light intensity at the lighting effect footprint. Lighting fixture 110A3 is wider than lighting fixture 110A and includes additional LEDs to increase the size of the lighting effect footprint. Lighting fixture 110A4 includes three individual lighting fixture components that are each smaller than the lighting fixture 110A but that are combined together to increase the collectively generated lighting effect footprint. Other lighting fixtures may optionally additionally and/or alternatively be provided apart from the four examples illustrated in FIG. 3.

A user may optionally select one of the four lighting fixture options presented in FIG. 3 as a desired lighting fixture for creating the manipulated lighting effect. After selection of one of the options the user may choose to order a producible lighting fixture that corresponds to the selected virtual lighting fixture. The producible lighting fixture may be premade or may be custom made based on the user selection. In some embodiments the user may further customize one or more characteristics of the lighting fixture such as, for example, lighting fixture color, lighting fixture material, generated light color options, controller software options, driver options, etc. After selection of one of the lighting fixture options the user may additionally or alternatively choose to further directly or indirectly alter the lighting effect generated by the selected option. For example, the user may further refine the lighting effect and be presented with additional lighting fixture options that may create the further refined lighting effect. Alternatively, if the user does not wish to select one of the provided options the user may revert back to the original lighting fixture 110A of FIG. 2 and optionally further refine the virtual lighting effect 120A and/or may select a different lighting fixture family to explore.

Figure 4:
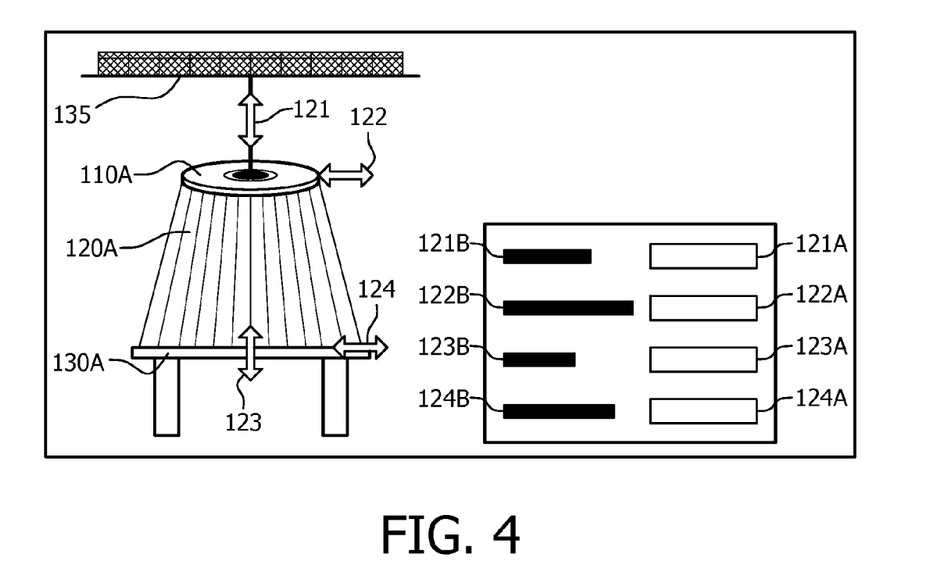
FIG. 4 illustrates another example virtual environment that includes one of the lighting fixtures of the lighting fixture families of FIG. 1 and illustrates parameters of the virtual environment or the virtual representation of the lighting fixture that may be adjusted by a user to manipulate a virtual lighting effect of the lighting fixture.

FIG. 4 illustrates another example of a virtual environment that includes the representative lighting fixture 110A of one of the lighting fixture families of FIG. 1. The representative lighting fixture 110A is illustrated suspended from the ceiling 135 over top of the dining table 130A. The lighting effect 120A is illustrated as being generated by the lighting fixture 110A and is directed toward the dining table 130A.

The lighting parameter adjustment arrows 121-124 are illustrated in FIG. 4. Lighting parameter value entry areas 121A-124A are also illustrated in combination with description areas 121B-124B that describe the lighting parameter value entry areas 121A-124A. The lighting parameter value entry areas 121A-124A are areas where a user may enter and/or adjust parameters such as numerical or other values to directly or indirectly specify one or more parameters of the lighting effect 120A. In some embodiments the parameters may be entered by a user utilizing a user interface (e.g., a virtual and/or external keyboard).

Lighting parameter value entry area 121A may be provided with a value that sets the vertical position of the lighting fixture 110A relative to the ceiling 135 and, as a result, adjusts the footprint of the virtual lighting effect 120A that is present on the table 130A and/or beyond the table 130A. Lighting parameter value entry area 122A may be provided with a value that sets the size of the generating area of the virtual lighting effect 120A at the lighting fixture 110A (e.g., the width of the upper portion of the virtual lighting effect 120A). Lighting parameter value entry area 123A may be provided with a value that sets the position of the table 130A relative to the lighting fixture 110 and, as a result, adjusts the virtual lighting effect 120A present on the table 130A and/or beyond the table 130A. Lighting parameter value entry area 124A may be provided with a value that sets the footprint of the virtual lighting effect 120A that is present on the table 130A. The lighting parameter value entry areas 121A-124A may be used in addition to or in lieu of the lighting parameter adjustment arrows 121-124 and/or other lighting parameter adjustment user interface.

Figure 5:
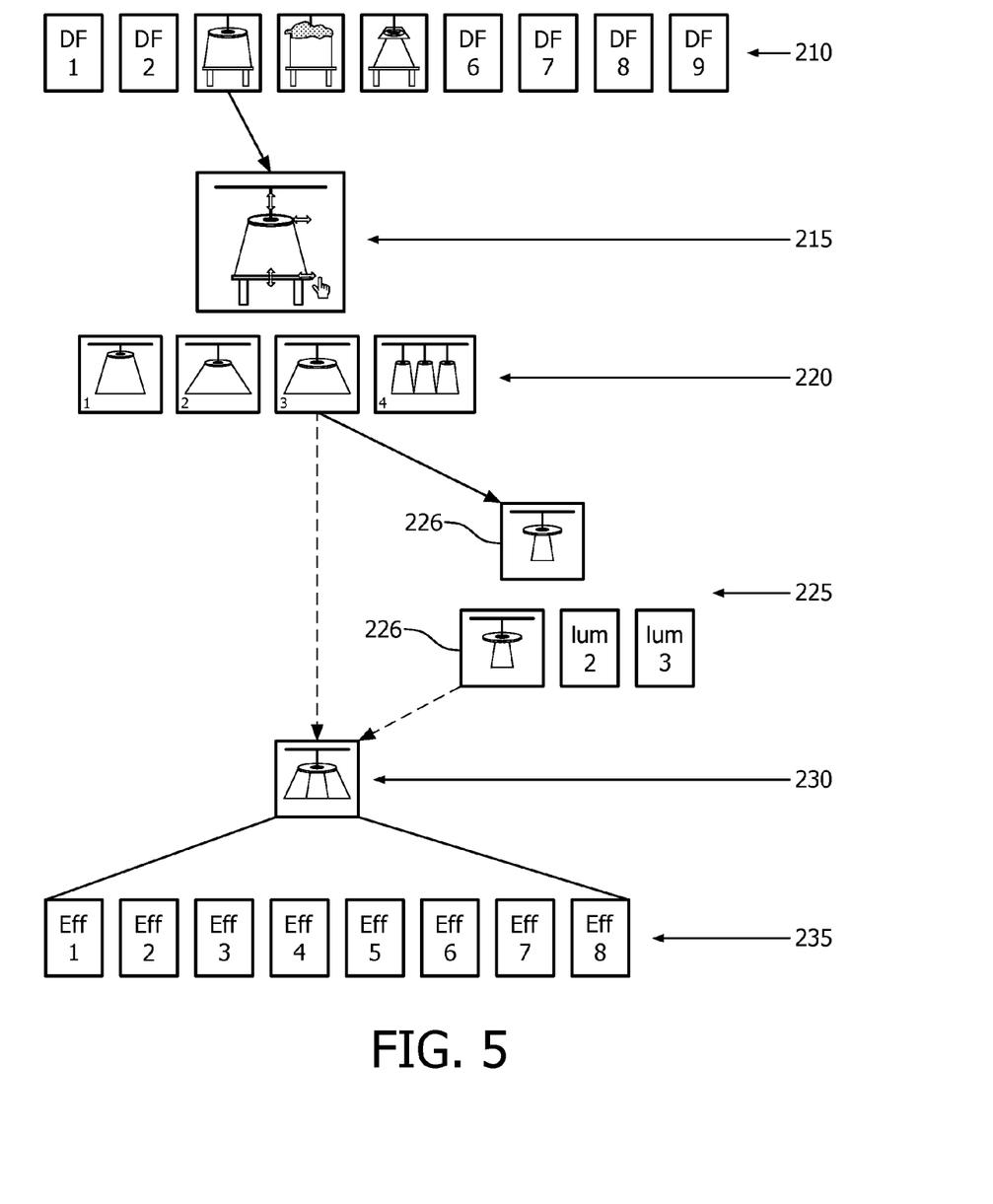
FIG. 5 illustrates an overview of an example of an interactive virtual lighting fixture catalog.

FIG. 5 illustrates an overview of an embodiment of an interactive virtual lighting fixture catalog. The design family exploration level 210 of the catalog shows a collection of lighting fixture families. For every lighting fixture design family, only one instance of a lighting fixture is shown. The customer obtains a broad overview of the available lighting fixture design families via viewing of the lighting fixture design families. In some implementations the customer can browse through the lighting fixture families and/or utilize filters to identify a collection of one or more lighting fixture families to view in additional detail. From the collection of lighting fixture families, the user can obtain a closer view of and/or additional information related to a desired lighting fixture family of the collection.

Upon selection of a lighting fixture family, the user is then presented with an instance of the lighting fixture family in a virtual environment at the design selection and virtual lighting effect adaptation level 215 of the catalog. The instance of the lighting fixture family is also presented with some user interface that enables the user to directly or indirectly change the properties of the virtual lighting effect generated by the instance of the lighting fixture. For example, properties of the lighting fixture instance and/or the virtual environment may be changed to indirectly alter the properties of the virtual lighting effect.

When the user changes the lighting effect and indicates completion of changing of the lighting effect, the catalog provides a plurality of lighting fixtures options that may be utilized to achieve the changed lighting effect at additional lighting fixture generation level 220 of the catalog. In some embodiments one or more of the additional lighting fixtures may be generated via identification from a database of lighting fixtures. For example, a database of lighting fixtures may be searched based on one or more parameters of the selected lighting fixture family, the lighting effect parameters, and/or the environmental parameters. In some embodiments one or more of the lighting fixtures may be created based on one or more known parameters. For example, a lighting fixture may be created based on one or more parameters of the selected lighting fixture family, the lighting effect parameters, known capabilities of one or more lighting fixture components, and/or the environmental parameters.

In some embodiments, one or more lighting fixtures may be generated by implementing one or more global rules applied to the instance of the lighting fixture. For example, global rules to adapt to a lighting effect change may include one or more of: repositioning the lighting fixture; resizing the lighting fixture; changing the optical properties of the lighting fixture (e.g., the optics paired with the LEDs, lenses provided over a light output opening of the lighting fixture, and/or optical reflectors of the lighting fixture); changing the performance of the light source of the lighting fixture (e.g., power and/or lux of an LED-based light source); changing the amount and/or arrangement of light sources of the lighting fixture; and/or using multiple instances of the same lighting fixture.

In some embodiments, implementation of one or more of the global rules may be constrained by one or more factors such as, for example: the maximum power/luminance of the light source of the lighting fixture; the maximum dimensions and weight of the lighting fixture; constraints from production methodologies; and/or manufacturing constraints (e.g., elements of the lighting fixture can only be taken from a set of fixed modules).

In some embodiments, the global rules will be utilized to generate one or more lighting fixture variations by selecting some parameters that are fixed and others that are subject to change. In some implementations a random generator may optionally be used to determine the values of the parameters subject to change. In some implementations other methodologies to determine the values for the remaining parameters may be utilized. For example, from an existing or random set of parameters the lighting effect may be calculated and deltas applied to the set of parameters to determine if the lighting effect is changed into the direction of the target manipulated lighting effect. Also, for example, if an inverse model function is available, the values may be calculated from the target manipulated lighting effect. For every lighting fixture, the unknown parameters may be determined or calculated from the model of the lighting fixture to verify that the lighting fixture can meet the requirements of the parameters.

As an example, a lighting fixture can be considered where the lighting effect is a function of the size of the lighting fixture and the beam shape. From a strategy rule, a set of three different sizes of the lighting fixture can be proposed (small, medium and large size lighting fixtures) and the necessary beam shape may then be derived. All these instances may then be represented as instances of the lighting fixture family and a 3D rendering of the lighting fixture and the effect is made and visualized as an item in the catalog. One of ordinary skill in the art, having had the benefit of the present disclosure, will recognize and appreciate that additional and/or alternative methods of identifying one or more lighting fixtures that are capable of producing a manipulated lighting effect may be implemented.

Upon selection of a lighting fixture presented at the new lighting fixture generation level 220, a user may optionally be provided with the option of further adapting the selected lighting fixture at lighting fixture adaptation level 225 of the catalog. In some embodiments, at lighting fixture adaptation level 225 one or more properties of the selected lighting fixture may be fixed, while other properties adapted to conform to a need and/or desire. For example, in some embodiments the appearance of the lighting fixture may be fixed but it may be desirable to additionally obtain the option of a different type of light output from the selected lighting fixture. The catalog can provide this by only modifying the light generation engine to enable the different type of light output to be obtained without modifying the appearance of the lighting fixture. For example, as illustrated in FIG. 5, a user may select lighting fixture 3 at new lighting fixture generation level 220. At lighting fixture adaptation level 225 the user may direct that the selected lighting fixture 3 should also be capable of producing a more narrow spot type output as illustrated at 226. One of ordinary skill in the art, having had the benefit of the present disclosure, will recognize and appreciate that additional and/or alternative parameters of the lighting fixture may optionally be adapted. In some implementations, at virtual lighting effect adaptation level 215 one or more properties of the selected lighting fixture may optionally be fixed, while other properties may be adapted to conform to a manipulated lighting effect.

If the adaptation requested in lighting fixture adaptation level 225 is possible, then at implementation level 230 the adaptation is implemented in the selected lighting fixture. For example, as illustrated in FIG. 5, the light generation engine of the selected lighting fixture was adapted at lighting fixture adaptation level 225 to have three different zones, thereby enabling illumination of only the middle zone to obtain the more narrow spot type output.

Optionally, at visualization level 235 possible effects that may be generated by the lighting fixture may be displayed. For example, the different footprints of light output that may be generated may be displayed. Also, for example, the different intensities and/or colors of light output that may be generated may be displayed.

Figure 6:
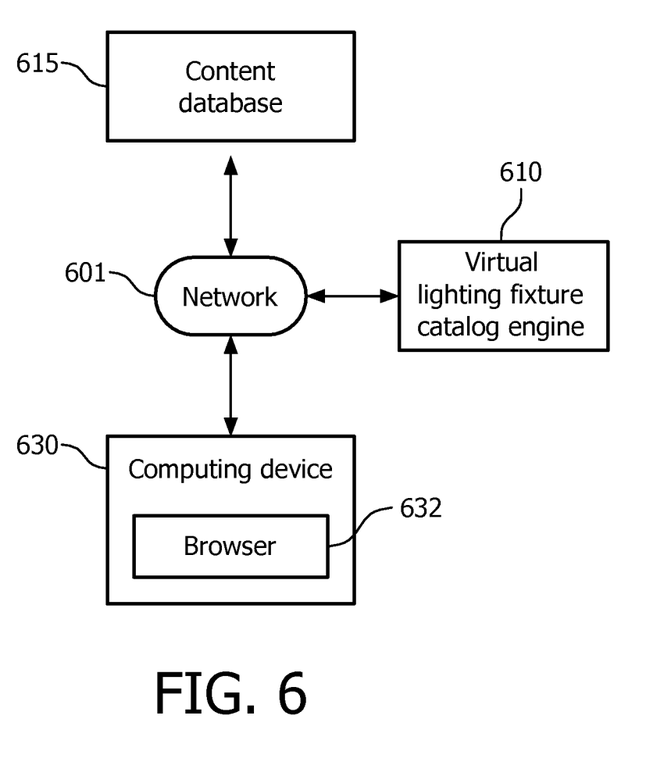
FIG. 6 illustrates an example environment that can be used to enable configuration of a lighting fixture through manipulation of a lighting effect in a virtual environment.

FIG. 6 illustrates an example environment that can be used to enable configuration of a lighting fixture through manipulation of a lighting effect in a virtual environment. The environment includes a communication network 601 that allows for communication between various components of the environment. The communication network 601 facilitates communication between the various components in the environment. In some implementations the communication network may include the Internet, one or more intranets, and/or one or more bus subsystems. The communication network 601 may optionally utilize one or more standard communications technologies, protocols, and/or inter-process communication techniques.

In some implementations, a user may access a lighting fixture catalog and interact with lighting fixture catalog engine 610 through a client computing device 630. The client computing device 630 includes memory for storage of data and software applications, a processor for accessing data and executing applications, and components the facilitate communication over the communication network 601. The computing device 630 executes one or more applications, such as web browsers (e.g., web browser 632), that enable the user to view and interface with a virtual environment generated by the lighting fixture catalog engine 610. For example, the web browser 632 may enable the user to browse through a virtual catalog, select a lighting fixture in the virtual catalog, and/or manipulate one or more parameters of a lighting effect generated by the lighting fixture via a user interface of the computing device 630.

The virtual lighting fixture catalog engine 610 may receive modified lighting effect input from client computing device 630 or elsewhere and utilize such modified lighting effect input to determine one or more lighting fixtures capable of producing the modified lighting effect represented by the modified lighting effect input utilizing techniques as described herein. The virtual lighting fixture catalog engine 610 may access data related to one or more of the lighting fixtures from content database 615 or elsewhere and utilize such data to determine one or more lighting fixtures capable of producing the identified modified lighting effect utilizing techniques as described herein. In some implementations the virtual lighting fixture catalog engine 610 may perform one or more of the steps of the methods described in herein with reference to FIGS. 1-6. The virtual lighting fixture catalog engine 610 may be implemented in hardware, firmware, and/or software running on hardware. For example, the virtual lighting fixture catalog engine 610 may be implemented in one or more computer servers.

Many other configurations are possible having more or less components than the environment shown in FIG. 6. For example, although the virtual lighting fixture catalog engine 610, the content database, and the client computing device 630 are illustrated in FIG. 6 as separate components, it is understood that in some environments the virtual lighting fixture catalog engine 610 and/or the content database 615 may optionally be partially or wholly implemented on the client computing device 630.

Figure 7:
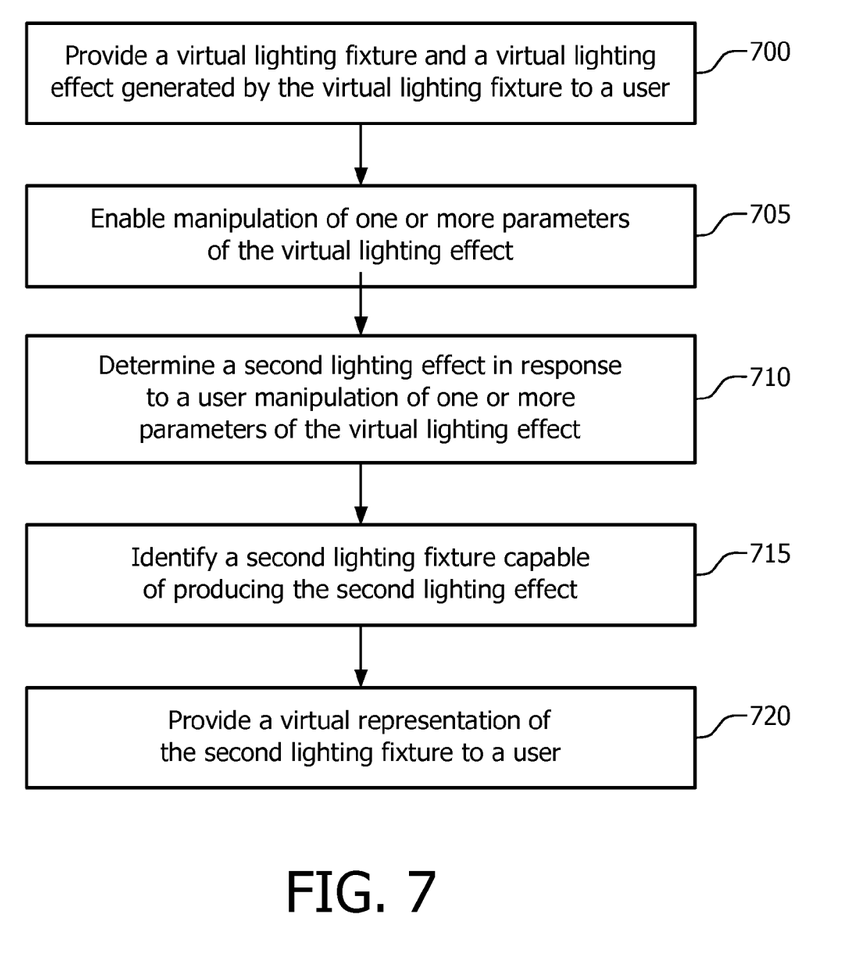
FIG. 7 illustrates a flow chart of an example method of enabling configuration of a lighting fixture through manipulation of a lighting effect in a virtual environment.

FIG. 7 illustrates a flow chart of an example method of enabling configuration of a lighting fixture through manipulation of a lighting effect in a virtual environment. Other embodiments may perform the steps in a different order, omit certain steps, and/or perform different and/or additional steps than those illustrated in FIG. 7. For convenience, aspects of FIG. 7 will be described with reference to a system of one or more computers that perform the process. The system may include, for example, the virtual lighting fixture catalog engine 610 of FIG. 6.

At step 700 a virtual lighting fixture and a virtual lighting effect generated by the virtual lighting fixture are provided to a user. In some implementations the virtual lighting fixture and the virtual lighting effect may be provided by the virtual lighting fixture catalog engine 610. The virtual lighting fixture and the virtual lighting effect may optionally be provided in combination with one or more environmental objects such as, for example, environmental objects corresponding to the type of lighting fixture, user selected environmental objects, and/or user generated environmental objects. In some embodiments step 700 may be performed in response to a user selecting a lighting fixture family that includes the virtual lighting fixture. In some implementations step 700 and FIGS. 2 and 4 may share one or more common aspects. Also, in some implementations step 700 and virtual lighting effect adaptation level 215 of the catalog of FIG. 5 may share one or more common aspects.

At step 705 manipulation of one or more parameters of the virtual lighting effect is enabled. In some implementations manipulation of the one or more parameters of the virtual lighting effect is enabled by the virtual lighting fixture catalog engine 610. The virtual lighting effect may optionally be manipulated via one or more user interfaces such as, for example, one or more external user input devices of a computer and/or one or more touchscreens. In some implementations step 705 and FIGS. 2 and 4 may share one or more common aspects. Also, in some implementations step 705 and virtual lighting effect adaptation level 215 of the catalog of FIG. 5 may share one or more common aspects.

At step 710 a second lighting effect is determined in response to a user manipulation of the virtual lighting effect.

In some implementations the second lighting effect may be determined by the virtual lighting fixture catalog engine 610. The second lighting effect may be determined based on the inputs from the user manipulation of the virtual lighting effect. In some implementations step 710 and FIGS. 2 and 4 may share one or more common aspects. Also, in some implementations step 705 and virtual lighting effect adaptation level 215 of the catalog of FIG. 5 may share one or more common aspects.

At step 715 a second lighting fixture that is capable of producing the second lighting effect is identified. In some implementations the second lighting fixture is identified by the virtual lighting fixture catalog engine 610 via consultation with the content database 615. The second lighting fixture may optionally be identified through implementation of one or more global rules applicable to the virtual lighting fixture. In some implementations step 715 and FIG. 3 may share one or more common aspects. Also, in some implementations step 705 and new lighting fixture generation level 220 of the catalog of FIG. 5 may share one or more common aspects.

At step 720 a virtual representation of the second lighting fixture is provided to a user. In some implementations the virtual representation of the second lighting fixture is provided to the user by the virtual lighting fixture catalog engine 610. The virtual representation of the second lighting fixture may optionally be provided in combination with one or more environmental objects such as, for example, environmental objects corresponding to the type of lighting fixture, user selected environmental objects, and/or user generated environmental objects. In some implementations step 715 and FIG. 3 may share one or more common aspects. Also, in some implementations step 705 and new lighting fixture generation level 220 of the catalog of FIG. 5 may share one or more common aspects. In some implementations the user may select the virtual representation for the second lighting fixture to submitting an order for the second lighting fixture. In some implementations the user may further modify one or more parameters of the second lighting fixture within the constraints of the second lighting fixture via virtual interface such as light output parameters and/or lighting fixture appearance.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Also, the reference numerals appearing in the claims, if any, are provided merely for convenience and should not be interpreted as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, implemented by at least one hardware processor, of enabling configuration of a lighting fixture through manipulation of a lighting effect in a virtual environment, comprising:
    providing the virtual environment, which includes first virtual lighting fixture and a first virtual lighting effect; said first virtual lighting fixture indicative of a first producible lighting fixture; said first virtual lighting effect generated by said first virtual lighting fixture and indicative of a first producible light output generated by said first producible lighting fixture;
    enabling a user to manipulate one or more parameters in said virtual environment to create a second virtual lighting effect; and
    providing, via said virtual environment, a second virtual lighting fixture in response to manipulation of said parameters; said second virtual lighting fixture indicative of a second producible lighting fixture; said second virtual lighting effect indicative of a producible second light output achievable by said second producible lighting fixture and non-achievable by said first producible lighting fixture,
    wherein an alteration of a dimension of the first virtual lighting fixture within said virtual environment by said user forms the second virtual lighting effect, which is different from the first virtual lighting effect, in said virtual environment.

2. The method of claim 1, wherein said virtual environment includes an environmental object.

3. The method of claim 2, wherein said first virtual lighting effect is incident on said environmental object.

4. The method of claim 2, further comprising enabling a user to manipulate the positioning of said first virtual lighting fixture relative to said environmental object in said virtual environment to manipulate said parameters, which are parameters of said first virtual lighting effect on said environmental object.

5. The method of claim 1, wherein the step of enabling a user to manipulate said parameters includes enabling direct manipulation of the dimensions of said first virtual lighting effect through selection and dragging of a marking associated with said first virtual lighting effect.

6. The method of claim 1, wherein the step of enabling a user to manipulate said parameters includes user entry of said parameters, which are parameters of said first virtual lighting effect.

7. The method of claim 1, wherein said parameters include at least one of footprint size, footprint shape, intensity, and color of said first virtual lighting effect.

8. The method of claim 1, further comprising submitting an order for said second producible lighting fixture after selection of said second producible lighting fixture by said user.

9. A method, implemented by at least one hardware processor, of enabling configuration of a lighting fixture through manipulation of a lighting effect in a virtual environment, comprising:
    providing the virtual environment, which includes a first virtual lighting fixture and a first virtual lighting effect; said first virtual lighting fixture indicative of a first producible lighting fixture; said first virtual lighting effect generated by said first virtual lighting fixture and indicative of a first producible light output achievable by said first producible lighting fixture;
    receiving a virtual lighting effect manipulation input from a user altering at least one parameter of said first virtual lighting effect;
    determining a second lighting effect based on said virtual lighting effect manipulation input;
    identifying a second virtual lighting fixture indicative of a second producible lighting fixture capable of producing said second lighting effect; and
    providing said second virtual lighting fixture to said user in said virtual environment,
    wherein the virtual lighting effect manipulation input includes an alteration of a dimension of the first virtual lighting fixture such that, for said determining the second lighting effect, the alteration defines said second lighting effect.

10. The method of claim 9, further comprising providing a second virtual lighting effect in said virtual environment indicative of said second lighting effect, wherein said second virtual lighting effect is generated by said second virtual lighting fixture in said virtual environment.

11. The method of claim 9, further comprising determining said second lighting effect is non-achievable by said first producible lighting fixture, wherein the identifying said second virtual lighting fixture is based on said determining said second lighting effect is non-achievable by said first producible lighting fixture.

12. The method of claim 9, wherein said virtual lighting effect manipulation input is generated by user manipulation of the position of said first virtual lighting fixture in said virtual environment.

13. The method of claim 9, wherein said virtual lighting effect manipulation input is generated by direct user manipulation of said dimensions of said first virtual lighting effect.

14. The method of claim 9, wherein said virtual lighting effect manipulation input is generated by user entry of a value of said parameter of said first virtual lighting effect.

15. The method of claim 9, further comprising submitting an order for said second producible lighting fixture after selection of said second producible lighting fixture by said user.

* * * * *